(12) United States Patent
Morizur (10) Patent No.: US 8,372,943 B2
(45) Date of Patent: Feb. 12, 2013

(54) ISOSORBIDE—CONTAINING POLYCARBONATES AND THEIR PREPARATION

(75) Inventor: Jean Francois Morizur, Evansville, IN (US)

(73) Assignee: SABIC Innovative Plastics IP B.V., Bergen Op Zoom (NL)

( * ) Notice: Subject to any disclaimer, the term of this patent is extended or adjusted under 35 U.S.C. 154(b) by 0 days.

(21) Appl. No.: 12/965,574

(22) Filed: Dec. 10, 2010

(65) Prior Publication Data

US 2012/0149863 A1 Jun. 14, 2012

(51) Int. Cl.
*C08G 63/02* (2006.01)
*C08G 64/00* (2006.01)
(52) U.S. Cl. ......... 528/190; 528/271; 528/272; 528/370
(58) Field of Classification Search .................. 528/271, 528/272, 370
See application file for complete search history.

(56) References Cited

U.S. PATENT DOCUMENTS

| 4,506,066 A | 3/1985 | Medem et al. |
| 6,597,426 B1 | 7/2003 | Siemensmeyer et al. |
| 2005/0143554 A1 | 6/2005 | Dhara et al. |
| 2010/0081784 A1* | 4/2010 | Brack et al. .................. 528/271 |

FOREIGN PATENT DOCUMENTS

DE 19739263 A1 3/1999

OTHER PUBLICATIONS

International Search Report from International Patent Application Publication No. WO2012/078825, dated Mar. 26, 2012, pp. 1-2.

* cited by examiner

*Primary Examiner* — Terressa Boykin
(74) *Attorney, Agent, or Firm* — Michael Best & Friedrich LLP; Todd S. Hofmeister; Paul A. Jenny (57) ABSTRACT

Provided herein are isosorbide-based bisphenol polymer structural units and methods of making the same. These structural units may be polymerized with one or more other types of structural units to form polymers, such as polycarbonates.

23 Claims, 4 Drawing Sheets

FIG. 1 p-hydroxybenzoic acid    Isosorbide                    Isosorbide-bisphenol

Copolymerized with: BPA, DMBPC, and DMBPA

ISOSORBIDE—CONTAINING POLYCARBONATES AND THEIR PREPARATION

FIELD OF THE INVENTION

The present invention relates to isosorbide-containing polycarbonates and their preparation through various methods of polymerization.

BACKGROUND

Polymers based on aliphatic diols and in particular isosorbides are of great interest to the chemical industry. Isosorbides are derived from biologically based sources, namely sugars, rather than from the petroleum feed stocks used to prepare other polymer structural units. Isosorbide-based materials and products are biodegradable, have a low net environmental impact, and can be utilized as renewable resources by the plastic manufacturing industry. These materials and products can be used for the production of polymeric materials such as polycarbonates. Polycarbonates are used in hundreds of applications such as eyeglass lenses and optical media, where their transparency and tough physical properties are beneficial.

According to the following reaction scheme, isosorbide can be made from biomass derived from starch through hydrolysis, hydrogenation, and dehydration reactions.

The efficient production of polycarbonates generally involves a number of trade-offs. For example, one can compensate for low reactivity of monomers by increasing catalyst concentration, time or temperature, but generally each such measure that one takes to make reaction conditions more aggressive involves a penalty in terms of increasing the yellowness of the transparent material.

Accordingly, there is a clear need for an efficient polymerization process to produce isosorbide-based polycarbonates having desirable color properties (i.e. low yellowness) and acceptably high molecular weight for commercial application.

SUMMARY OF THE INVENTION

The present invention is directed to isosorbide-containing polymers and a method of making them. The method of making the polymers may comprise subjecting at least one isosorbide-bisphenol of formula I:

and a formula I-reacting compound to polymerization conditions, wherein the isosorbide-bisphenol and the formula I-reacting compound react to form a structural unit that is polymerized into an isosorbide-containing polymer. $R_1$ is an isosorbide unit and $R_2$-$R_9$ are independently selected from the group consisting of a hydrogen, a halogen, a C1-C6 alkyl, a methoxy, an ethoxy, and an alkyl ester. The isosorbide unit may be derived from any isosorbide. For example, the isosorbide may be 1,4:3,6-dianhydro-D-sorbitol; 2,6-dioxabicyclo[3.3.0]octan-4,8-diol; 1,4:3,6-dianhydro-D-glucitol; 2,3,3a,5,6a-hexahydrofuro[3,2-b]furan-3,6-diol, and/or isomers thereof. The isosorbide-bisphenol may have a pKa value of between 8 and 11. The isosorbide-containing polymer may be a homopolymer or a copolymer.

The formula I-reacting compound may be one or more of phosgene, a triphosgene, diacyl halide, dihaloformate, dicyanate, diester, diepoxy, diarylcarbonate, dianhydride, dicarboxylic acid, and diacid chloride.

The structural unit may be polymerized with a dihydroxy compound of formula II:

wherein Z may be an aromatic compound or an aliphatic compound.

The aromatic dihydroxy compound may be one or more of 4,4'(3,3,5-trimethylcyclohexylidene)diphenol; 4,4'-bis(3,5-dimethyl)diphenol, 1,1-bis(4-hydroxy-3-methylphenyl)cyclohexane, 1,1-bis(4'hydroxy-3'methylphenyl)cyclohexane (DMBPC), 4,4'-1-methyl-4-(1-methyl-ethyl)-1,3-cyclohexandiyl]bisphenol (1,3 BHPM), 4-[1-[3-(4-hydroxyphenyl)-4-methylcyclohexyl]-1-methyl-ethyl]-phenol (2,8 BHPM), 3,8-dihydroxy-5a,10b-diphenyl-coumarano-2',3',2,3-coumarane (DCBP), 2-phenyl-3,3-bis(4-hydroxyphenyl)heptane, 2,4'-dihydroxydiphenylmethane, bis(2-hydroxyphenyl)metane, bis(4-hydroxyphenyl)methane, bis(4-hydroxy-5-nitrophenyl)methane, bis(4-hydroxy-2,6-dimethyl-3-methoxyphenyl)methane, 1,1-bis(4-hydroxyphenyl)ethane, 1,1-bis(4-hydroxy-2-chlorophenyl)ethane, 2,2-bis(4-hydroxyphenyl)propane (BPA), 2,2-bis(3-phenyl-4-hydroxyphenyl)propane, 2,2-bis(4-hydroxy-3-methylphenyl)propane, 2,2-bis(4-hydroxy-3-ethylphenyl)propane, 2,2-bis(4-hydroxy-3-isopropylphenyl)propane, 2,2-bis(4-hydroxy-3,5-dimethylphenyl)propane, 2,2-bis(3,5,3',5'-tetrachloro-4,4'-dihydroxyphenyl)propane, bis(4-hydroxyphenyl)cyclohexymethane, 2,2-bis(4-hydroxyphenyl)-1-phenylpropane, 2,4-dihydroxyphenyl sulfone, 4,4'-dihydroxydiphenylsulfone (BPS), bis(4-hydroxyphenyl)methane (bisphenol F, BPF), 4,4'dihydroxy-1,1-biphenyl, 2,6-dihydroxy naphthalene, hydroquinone, resorcinol, C1-3 alkyl-substituted resorcinols, 3-(4-hydroxyphenyl)-1,1,3-trimethylindan-5-ol, 1-(4-hydroxyphenyl)-1,3,3-trimethylindan-5-ol, or 2,2,2',2'-tetrahydro-3,3,3',3'-tetramethyl-1,1'-spirobi[1H-indene]-6,6'-diol, 1,3-propylene glycol, 1,2- propylene glycol, 2,2-diethyl-1,3-propanediol, 2,2-dimethyl-1,3-propanediol, 2-ethyl-2-butyl-1,3-polypropanediol, 2-ethyl-2-isobutyl-1,3-propanediol, 1,3-terbutanediol, 1,4-butanediol, 1,5-pentanediol, 1,6-hexanediol, 2,2,4-tnmethyl-1,6-hexanediol, 1,3-cyclohexanedimethanol, 1,4-cyclohexanedimethanol, or a 2,2,4,4-tetramethyl-1,3-cyclobutanediol.

The polymerization conditions may be interfacial, melt, solid state, or solution.

The present invention is also directed to a polymer formed from the methods described herein. The polymer may be a polycarbonate, a polyurethane, a polyurea, a polyarylate, a polyester, a polyether, a polyetheramide, a polyformal, or a polyphenylene ether, for example. The polycarbonate may be wherein n is greater than 1. The polycarbonate may be wherein z is an aromatic compound and n is greater than 1.

DETAILED DESCRIPTION

Use of the herein described polymerization methods allows for the efficient production of isosorbide-containing polymers. The inventor has discovered that isosorbide-bisphenols may be reacted with isosorbide-bisphenol-reacting compounds to form polymer structural units, which can be polymerized to form different kinds of polymers, such as homopolymers or copolymers. A specific structural unit may be polymerized with one or more other structural units or monomers to form the copolymers. The polymerization methods described herein allow for the efficient and aggressive production of polycarbonates without, for example, drawbacks associated with increased yellowness of the resultant material.

1. DEFINITIONS

The terminology used herein is for the purpose of describing particular embodiments only and is not intended to be limiting. As used in the specification and the appended claims, the singular forms "a," "and" and "the" include plural references unless the context clearly dictates otherwise.

"Alkyl" as used herein may mean a linear, branched, or cyclic group, such as a methyl group, ethyl group, n-propyl group, isopropyl group, n-butyl group, isobutyl group, tert-butyl group, n-pentyl group, isopentyl group, n-hexyl group, isohexyl group, cyclopentyl group, cyclohexyl group, and the like.

"Copolymer" as used herein may mean a polymer derived from two or more structural unit or monomeric species, as opposed to a homopolymer, which is derived from only one structural unit or monomer.

"C3-C6 cycloalkyl" as used herein may mean cyclopropyl, cyclobutyl, cyclopentyl and cyclohexyl.

"Halogen" or "halogen atom" as used herein may mean a fluorine, chlorine, bromine or iodine atom.

"Heteroaryl" as used herein may mean any aromatic heterocyclic ring which may comprise an optionally benzocondensed 5 or 6 membered heterocycle with from 1 to 3 heteroatoms selected among N, O or S, Non limiting examples of heteroaryl groups may include pyridyl, pyrazinyl, pyrimidinyl, pyridazinyl, indolyl, imidazolyl, thiazolyl, isothiazolyl, pyrrolyl, phenyl-pyrrolyl, furyl, phenyl-furyl, oxazolyl, isoxazotyl, pyrazolyl, thienyl, benzothienyl, isoindolinyl, benzoimidazolyl, quinolinyl, isoquinolinyl, 1,2,3-triazolyl, 1-phenyl-1,2,3-triazolyl, and the like.

"Polycarbonate" as used herein may mean an oligomer or polymer comprising residues of one or more polymer structural units, or monomers, joined by carbonate linkages.

"Straight or branched C1-C3 alkyl" or "straight or branched C1-C3 alkoxy" as used herein may mean methyl, ethyl, n-propyl, isopropyl, methoxy, ethoxy, n-propoxy and isopropoxy.

Unless otherwise indicated, each of the foregoing groups may be unsubstituted or substituted, provided that the substitution does not significantly adversely affect synthesis, stability, or use of the compound.

"Substituted" as used herein may mean that any at least one hydrogen on the designated atom or group is replaced with another group provided that the designated atom's normal valence is not exceeded. For example, when the substituent is oxo (i.e., =O), then two hydrogens on the atom are replaced. Combinations of substituents and/or variables are permissible provided that the substitutions do not significantly adversely affect synthesis or use of the compound.

The terms "structural unit" and "monomer" are interchangeable as used herein.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. COMPONENTS FOR MAKING ISOSORBIDE-CONTAINING POLYMERS

Provided herein is a method of making isosorbide-containing polymers. The method centers on subjecting at least one isosorbide-bisphenol and an isosorbide-bisphenol-reacting compound to polymerization conditions whereby structural units are formed and polymerized to produce isosorbide-containing polymers. The polymers contain at least one isosorbide-containing monomer. The isosorbide-containing polymer may be a homopolymer or a copolymer. To form a copolymer, other monomers, which may be non-isosorbide containing monomers, for example, may be reacted with the at least one isosorbide-bisphenol and an isosorbide-bisphenol-reacting compound under the polymerization conditions. The polymerization conditions are dictated by the type of polymerization method, such as interfacial polymerization or melt polymerization.

a. Isosorbide-Bisphenol

Isosorbide-bisphenol for making polymers may be represented by formula (I):

R1 is an isosorbide unit and R2-R9 may be independently selected from the group consisting of a hydrogen, a halogen, a C1-C6 alkyl, a methoxy, an ethoxy, and an alkyl ester.

The isosorbide unit may be represented by formula (III):

(III)

The isosorbide unit may be derived from an isosorbide, a mixture of isosorbide, a mixture of isomers of isosorbide, and/or from individual isomers of isosorbide. The stereochemistry for the isosorbide-based carbonate units of formula IV is not particularly limited. Specifically, isosorbide has the general formula IV:

(IV)

and can be a single diol isomer or mixture of diol isomers. The stereochemistry for the isosorbide of formula IV is also not particularly limited. These diols may be prepared by the dehydration of the corresponding hexitols. Hexitols are produced commercially from the corresponding sugars (aldohexose). Aliphatic diols of formula IV include 1,4:3,6-dianhydro-D glucitol, of formula V; 1,4:3,6-dianhydro-D mannitol, of formula VI; and 1,4:3,6-dianhydro-L iditol, of formula VII, and any combination thereof. Isosorbides are available commercially from various chemical suppliers including Cargill, Roquette, and Shanxi.

V

VI

VII

The diol of formula IV may be desirable because it is rigid, chemically and thermallyl stable aliphatic diol that may be used to produce higher Tg copolymers than the other diols of formulas V and VI.

The isosorbide-bisphenol may have a pKa of between 8 and 11.

b. Isosorbide-Bisphenol (Formula I)—Reacting Compound

The isosorbide-bisphenol reacting compound may react with the isosorbide-bisphenol represented by formula I. The isosorbide-bisphenol reacting compound may be one or more of phosgene, a triphosgene, diacyl halide, dihaloformate, dicyanate, diester, diepoxy, diarylcarbonate, dianhydride, dicarboxylic acid, and/or diacid chloride. The isosorbide-bisphenol reacting compound and the isosorbide-bisphenol may react under polymerization conditions to form a polymer structural unit, which can be polymerized.

c. Other Monomers

The one or more isosorbide-bisphenol structural unit(s), which may be identical or different, may be polymerized with one or more other non-isosorbide-containing monomer compounds ("other monomers") (e.g. a second, third, fourth, fifth, sixth, etc., monomer compound). The other monomer(s) or compounds may be optionally selected for incorporation into the product polymer. Therefore, the polymers or polycarbonates may be isosorbide-containing copolymers.

The isosorbide-bisphenol monomers and other monomers may be randomly incorporated into the polymer. For example, the copolymer may be arranged in an alternating sequence following a statistical distribution, which is independent of the mole ratio of the structural units present in the polymer chain. A random copolymer may have a structure, which can be indicated by the presence of several block sequences of isosorbide-containing monomers (I-I) and other monomers (O-O) and alternate sequences (I-O) or (O-I), that follow a statistical distribution. In a random x:(1-x) copolymer, wherein x is the mole percent of the other monomer(s) and 1-x is the mole percent of the isosorbide-containing monomer, one can calculate the distribution of each monomer using peak area values determined by $^{13}$C NMR, for example.

The copolymer may have alternating copolymers with regular alternating I and O units (-I-O-I-O-I-O-I-O-), I and O units arranged in a repeating sequence (e.g. a periodic copolymer having the formula: (I-O-I-O-O-I-I-I-I-O-O-O)n)). The copolymer may be a statistical copolymer in which the sequence of monomer residues follows a statistical rule. For example, if the probability of finding a given type monomer residue at a particular point in the chain is equal to the mole fraction of that monomer residue in the chain, then the polymer may be referred to as a truly random copolymer. The copolymer may be a block copolymer that comprises two or more homopolymer subunits linked by covalent bonds (-I-I-I-I-I-O-O-O-O-). The union of the homopolymer subunits may require an intermediate non-repeating subunit, known as a junction block. Block copolymers with two or three distinct blocks are called diblock copolymers and triblock copolymers, respectively.

The other monomer may be a dihydroxy compound. The dihydroxy compound may be represented by formula (II):

wherein Z may be an aromatic compound or an aliphatic compound.

The dihydroxy compound may be any bisphenol compound. The dihydroxy compound may be a 4,4'(3,3,5-trimethylcyclohexylidene)diphenol; a 4,4'-bis(3,5-dimethyl) diphenol, a 1,1-bis(4-hydroxy-3-methylphenyl)cyclohexane, a 1,1-bis(4'hydroxy-3'methylphenyl)cyclohexane (DMBPC), a 4,4'-1-methyl-4-(1-methyl-ethyl)-1,3-cyclohexandiyl]bisphenol (1,3 BHPM), a 4-[1-[3-(4-hydroxyphenyl)-4-methylcyclohexyl]-1-methyl-ethyl]-phenol (2,8 BHPM), a 3,8-dihydroxy-5a,10b-diphenyl-coumarano-2',3', 2,3-coumarane (DCBP), a 2-phenyl-3,3-bis(4-hydroxyphenyl)heptane, a 2,4'-dihydroxydiphenylmethane, a bis(2-hydroxyphenyl)metane, a bis(4-hydroxyphenyl)methane, a bis (4-hydroxy-5-nitrophenyl)methane, a bis(4-hydroxy-2,6-dimethyl-3-methoxyphenyl)methane, a 1,1-bis(4-hydroxyphenyl)ethane, a 1,1-bis(4-hydroxy-2-chlorophenyl) ethane, a 2,2-bis(4-hydroxyphenyl)propane (BPA), a 2,2-bis (3-phenyl-4-hydroxyphenyl)propane, a 2,2-bis(4-hydroxy-3-methylphenyl)propane, a 2,2-bis(4-hydroxy-3-ethylphenyl)propane, a 2,2-bis(4-hydroxy-3-isopropylphenyl)propane, a 2,2-bis(4-hydroxy-3,5-dimethylphenyl)propane, a 2,2-bis(3,5,3',5'-tetrachloro-4,4'-dihydroxyphenyl)propane, a bis(4-hydroxyphenyl) cyclohexymethane, a 2,2-bis(4-hydroxyphenyl)-1-phenylpropane, a 2,4-dihydroxyphenyl sulfone, 4,4'-dihydroxydiphenylsulfone (BPS), bis(4-hydroxyphenyl) methane (bisphenol F, BPF), a 4,4'dihydroxy-1,1-biphenyl, 2,6-dihydroxy naphthalene, a hydroquinone, a resorcinol, a C1-3 alkyl-substituted resorcinol, a 3-(4-hydroxyphenyl)-1, 1,3-trimethylindan-5-ol, a 1-(4-hydroxyphenyl)-1,3,3-trimethylindan-5-ol, or a 2,2,2',2'-tetrahydro-3,3,3',3'-tetramethyl-1,1'-spirobi[1H-indene]-6,6'-diol. The dihydroxy compound may be 1,3-propylene glycol, 1,2-propylene glycol, 2,2-diethyl-1,3-propanediol, 2,2-dimethyl-1,3-propanediol, 2-ethyl-2-butyl-1,3-polypropanediol, 2-ethyl-2-isobutyl-1,3-propanediol, 1,3-terbutanediol, 1,4-butanediol, 1,5-pentanediol, 1,6-hexanediol, 2,2,4-tnmethyl-1,6-hexanediol, 1,3-cyclohexanedimethanol, 1,4-cyclohexanedimethanol, or a 2,2,4,4-tetramethyl-1,3-cyclobutanediol.

3. ISOSORBIDE-CONTAINING POLYMERS

The isosorbide-containing polymer may be a polycarbonate. The isosorbide-bisphenol may be polymerized to form a homopolymer, the isosorbide-bisphenol may be polymerized with one or more other isosorbide-bisphenol structural units and/or it may be polymerized with one or more other non-isosorbide-containing monomers to form a copolymer. The homopolymers may be manufactured by selecting and reacting a single polymerizable isosorbide-containing monomer. Copolymers can be manufactured by selecting and reacting two or more different polymerizable monomers, wherein at least one monomer is an isosorbide-containing monomer, such as isosorbide bisphenol-containing structural unit. The isosorbide-containing polymer may be a polyurethane, a polyurea, a polyarylate, a polyester, a polyether, a polyetheramide, a polyformal, and a polyphenylene ether.

The polymer may have a weight average molecular weight (Mw) of about 3,000 to about 150,000, of about 10,000 to about 125,000, of about 50,000 to about 100,000, or of about 75,000 to about 90,000, and a glass transition temperature (Tg) of about 80° C. to about 300° C., of about 100° C. to about 275° C., of about 125° C. to about 250° C., of about 150° C. to about 225° C., or of about 175° C. to about 200° C. The polymer may have a high mechanical strength. The elastic modulus may be about 2.0 GPa to about 6 Gpa or about 3.0 GPa to about 5 Gpa, as determined by, for example, an instrumented indentation technique. The polymer may have a hardness of about 150 MPa to about 350 MPa, of about 200 MPa to about 325 MPa, of about 225 MPa to about 300 MPa, or of about 250 MPa to about 275 MPa. The polymer may have a Fries product concentration of less than about 500 ppm, less than about 400 ppm, less than about 300 ppm, less than about 200 ppm, or less than about 100 ppm. The Fries product concentration may be determined by high performance liquid chromatography (HPLC). The polymer may exhibit lower refractive index (RI), higher scratch resistance and/or lower oxygen permeability compared to conventional homo- or copolymers. The polymer may be optically active.

The herein described polymers may be blended with other polymers, such as thermoplastics and thermosets. The herein described polymers may be blended with polycarbonates including, but not limited to, conventional BPA polycarbonate and polycarbonates made using monomers such as resorcinol, 1,1-bis(4'-hydroxy-3'methyl phenyl)cyclohexane and 4,4'[1-methyl-4-91-methylethyl)-1,3-cyclohexandiyl] bisphenol. The herein described polymers may be blended with an aliphatic polyester. The aliphatic polyester may be polycyclohexylidene cyclohexanedicarboxylate (PCCD).

4. METHOD FOR MAKING ISOSORBIDE-CONTAINING POLYMERS

The method centers on subjecting an isosorbide-bisphenol and an isosorbide-bisphenol-reacting compound to polymerization conditions whereby isosorbide-containing polymers are formed. The polymerization conditions are dictated by the type of polymerization method, such as interfacial polymerization, melt polymerization, solid state polymerization, or solution polymerization.

(1) Interfacial Polymerization Conditions

The reaction conditions for interfacial polymerization may vary; however, an exemplary process may involve dissolving or dispersing the isosorbide-bisphenol in an aqueous caustic soda or potash resulting in a first mixture. The first mixture may be added to a suitable water-immiscible solvent medium resulting in a second mixture. The second mixture may be contacted with a catalyst such as, for example, triethylamine or a phase transfer catalyst, under controlled pH conditions. The second mixture may optionally be contacted with one or more other isosorbide bisphenol monomers and/or one or more other monomers. The pH may be between 8 and 11.5, between 9 and 11, or between 9.5 and 10.5. The second mixture may also be contacted with a capping agent, which may limit the molecular weight growth rate of the resulting polymer.

(a) Water Immiscible Solvent

The water immiscible solvent may be any water immiscible solvent. The water immiscible solvent may be a methylene chloride, 1,2-dichloroethane, chlorobenzene, and/or toluene.

(b) Capping Agent

The capping agent may be at least one of a mono-phenolic compound, a mono-carboxylic acid chloride, and/or a monochloroformate. The capping agent may be incorporated into the resultant polymer. If the capping agent is incorporated into the resultant polymer, the capping agent may be referred to as an end group.

Monophenolic capping agents include monocyclic phenols, such as phenol, C1-C22 alkyl-substituted phenols, p-cumyl-phenol, p-tertiary-butyl phenol, hydroxyl diphenyl; monoethers of diphenols, such as p-methoxyphenol. Alkyl-substituted phenols include those with branched chain alkyl substituents having 8 to 9 carbon atoms. A mono-phenolic UV absorber may be used as a capping agent. Such compounds include 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5,-triazines and their derivatives, and the like. Specifically, monophenolic chain stoppers include phenol, p-cumylphenol, and/or resorcinol monobenzoate.

The mono-carboxylic acid chloride may be a monocyclic, mono-carboxylic acid chloride, such as a benzoyl chloride, C1-C22 alkyl-substituted benzoyl chloride, 4-methylbenzoyl chloride, halogen-substituted benzoyl chloride, bromobenzoyl chloride, 4-methylbenzoyl chloride, halogen-substituted benzoyl chloride, bromobenzoyl chloride, cinnamoyl chloride, 4-nadimidobenzoyl chloride, and combination s thereof. Other examples of a mono-carboxylic acid chloride include polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with up to 22 carbon atoms may also be used. Functionalized chlorides of aliphatic monocarboxylic acids, such as acryloyl chloride and methacryoyl chloride may also be used. Also useful are mono-chloroformates. Examples of a mono-chloroformate include monocyclic, mono-chloroformates, such as phenyl chloroformate, alkyl-substituted phenyl chloroformate, p-cumyl phenyl chloroformate, toluene chloroformate, and combinations thereof.

(c) Catalyst

The catalyst may be a phase transfer catalyst. The phase transfer catalyst may have the formula: $(R^3)_4Q^+X$, wherein each $R^3$ is the same or different, and is a C1-10 alkyl group; Q is a nitrogen or phosphorus atom; and X is a halogen atom or a C1-8 alkoxy group or C6-18 aryloxy group. Exemplary phase transfer catalysts include $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl$^-$, Br$^-$, a $C_{1-8}$ alkoxy group or a $C_{6-18}$ aryloxy group. The phase transfer catalyst may be $CH_3[CH_3(CH_2)_3]_3NCl$ (methyl tri-n-butyl ammonium chloride).

The phase transfer catalyst may be added to the reaction in an effective amount. An effective amount of the phase transfer catalyst may be between 0.1 wt % to 10 wt % based on the weight of bisphenol in the first or second mixture. The effective amount of the phase transfer catalyst may be between 0.5 wt % to 2 wt % based on the weight of the dihydroxy compound in the first or second mixture.

(2) Melt Polymerization Conditions

The reaction conditions for melt polymerization may vary; however, an exemplary process may involve co-reacting in a molten state, the isosorbide-bisphenol monomer and, optionally, the one or more other monomers, in the presence of a transesterification catalyst in a mixer, extruder, or the like to form a dispersion. The dispersion may be uniform. Any volatile monohydric phenol may be removed from the molten reactants by distillation. The resultant polymer is isolated as a molten residue.

(a) Transesterification Catalyst

The transesterification catalyst may be one or more of tetrabutylammonium hydroxide, methyltributylammonium hydroxide, tetrabutylammonium acetate, tetrabutylphosphonium hydroxide, tetrabutylphosphonium acetate, and/or tetrabutylphosphonium phenolate. The melt transesterification catalyst may be one or more of titanium isopropoxide, a hydroxide of an alkali metal, a hydroxide of an alkaline earth metal, an alkali metal salt, an alkaline earth metal salt, a quaternary ammonium salt of boron hydride, a quaternary ammonium salt of aluminum hydride, a hydride of an alkali metal, a hydride of an alkaline earth metal, an aryloxide of an alkali metal, an aryloxide of an alkaline earth metal, an organic salt of an alkali metal, an organic salt of an alkaline earth metal, a boron compound, a silicon compound, a germanium compound, a tin compound, an organotin compound, a lead compound, an onium compound, an antimony compound, a manganese compound, a titanium compound, and a zirconium compound.

The hydroxide of an alkali metal or an alkaline earth metal may be a lithium hydroxide, a sodium hydroxide, a potassium hydroxide or a calcium hydroxide. The quaternary ammonium salts of boron hydride and of aluminum hydride may be a lithium aluminum hydride, sodium boron hydride and tetramethyl ammonium boron hydride. The hydrides of an alkali metal and of an alkaline earth metal may be lithium hydride, sodium hydride or calcium hydride. The alkoxides of an alkali metal and of an alkaline earth metal may be lithium methoxide, sodium ethoxide or calcium methoxide. The aryloxides of an alkali metal and of an alkaline earth metal may be lithium phenoxide, sodium phenoxide, magnesium phenoxide, LiO—Ar—OLi, wherein Ar represents an arylene group, and NaO—Ar—ONa, wherein Ar is an arylene group. The organic salts of an alkali metal and of an alkaline earth metal may be lithium acetate, calcium acetate or sodium benzoate. The zinc compounds may be zinc oxide, zinc acetate or zinc phenoxide. The boron compounds may be boron oxide, boric acid, sodium borate, trimethyl borate, tributyl borate, triphenyl borate, ammonium borate or phosphonium borate. The silicon compounds may be silicon oxide, sodium silicate, tetraalkylsilicon, tetraarylsilicon or diphenyl-ethyl-ethoxy-silicon. The germanium compounds may be germanium oxide, germanium tetrachloride, germanium ethoxide or germanium phenoxide. The tin compounds may be tin oxide, dialkyltin oxide, dialkyltin carboxylate or tin acetate. The tin compounds that have an alkoxy group or an aryloxy group bonded to tin may include ethyltin tributoxide and organotin compounds. Lead compounds include lead oxide, lead acetate, lead carbonate and basic lead carbonate. Alkoxides and aryloxides of lead or organolead may also be used as a metal transesterification catalyst. Onium compounds may include quaternary ammonium salt, quaternary phosphonium salt, or a quaternary arsonium salt. The antimony compounds may include antimony oxide and antimony acetate. The manganese compounds may include manganese acetate, manganese carbonate and manganese borate. The titanium compounds include titanium oxide and titanium alkoxides and titanium aryloxide. The zirconium compounds include zirconium acetate, zierconium oxide, circonium alkoxide, zirconium aryloxide, and zirconium acetylacetone.

In addition to the foregoing, transesterification catalysts used herein may include tetrabutylammonium hydroxide, methyltributylammonium hydroxide, tetrabutylammonium acetate, tetrabutylphosphonium hydroxide, tetrabutylphosphonium acetate, or tetrabutylphosphonium phenolate.

The transesterification catalyst as used herein may be one or more of the foregoing compounds.

(3) Solid-State Polymerization

Solid State Polymerization is a process in which the polymer chain lengths may be increased by heat in the absence of oxygen and water, by means of, for example, vacuum or purging with an inert gas to drive off by-products that may be produced by certain reactions. The reaction may be driven by temperature, pressure, and the diffusion of by-products from the interior of the pellet to the surface. Solid-state polymerization may be used after melt-polymerization for the purpose of enhancing the mechanical and rheological properties of various polymers before injection blow molding or extruding. Solid state polymerization is widely applied in industrial manufacture settings for the production of various polymers, such as bottle-grade PET, films, and industrial fibers.

Solid-state polymerization is generally carried out under tumultuous conditions sufficient to promote polymerization of monomers to a suitable molecular weight. Such tumultuous conditions may be created by subjecting the monomers and/or the growing polymer to tumbling, the pumping of inert gas into the system to promote fluidization of polymer particle, e.g., pellets, chips, flakes, powder, and the like. The solid-state polymerization can be carried out at atmospheric pressure and/or under reduced pressure, e.g. from 1 atmosphere to 1 mbar. Solid-state polymerization is generally described in U.S. Pat. No. 7,812,077, the contents of which are incorporated herein by reference.

(4) Solution Polymerization

Solution polymerization generally involves dissolving a monomer in a non-reactive solvent that contains a catalyst. The heat released by the reaction is absorbed by the solvent, such that the reaction rate may be reduced. A benefit that is generally associated with solution polymerization is that it reduces the viscosity of the reaction thereby not allowing auto-acceleration at high monomer concentrations. Solution polymerization is well-known in the art. An example of solution polymerization is described in Example 3 of U.S. Pat. No. 7,671,169, the contents of which are herein incorporated by reference.

(5) Solvent

In any of the foregoing described reactions and mixtures, a solvent may be used. The solvent may be any solvent. The solvent may be an organic solvent. The solvent may be aromatic. The solvent may be xylene, benzene, cyclohexane, toluene, 1,2-dichloroethane, ethyl acetate, a mixture of two or more solvents, such as ethyl acetate:hexane. The mixture may be a 50:50 (1 wt/1 vol.) mixture. The organic solvent may have at least one carbon atom and one hydrogen atom, have a low molecular weight, and exist in liquid form at room temperature. The solvent may be an aliphatic-chain compound, such as n-hexane. The solvent may be an aromatic compound with a 6-carbon ring, such as benzene or xylene. The aliphatic or aromatic solvent may contain a substituted halogen element and may be referred to as a halogenated hydrocarbon, such as perchloroethylene (PCE or PER), trichloroethylene (TCE), and carbon tetrachloride. Alcohols, ketones, glycols, esters, ethers, aldehydes, and pyridines may be substitutions for a hydrogen group.

(6) Mixers and Extruders

The mixer and/or extruder may be any mixer or extruder. Several mixers and extruders are commercially available and may be used in conjunction with the above-described methods. Examples of extruders and mixers may be found in U.S. Pat. No. 4,419,014 and U.S. Pat. No. 7,097,345, which are herein incorporated by reference in their entirety. The mixer and/or extruder may be any mixer or extruder that is generally used for mixing or extruding one or more raw materials. The mixer may be a continuous mixer or a batch mixer. The continuous mixer may be a kneader mixer or a pug mixer. The extruder may be a dome, radial, or basket extruder. The mixer or extruder may adjust the temperature of the raw material.

b. Alkali Metals

Alkali metals, such as lithium, sodium, and potassium, are known to be impurities in several monomer compounds and especially in dihydroxy compounds. They can be present individually or combined as salts or as some other structures with other chemicals. Alkali metals can act as a catalyst to the polymerization reaction. To reduce the tendency of the reaction mixture to react, one may implement a monomer conditioning step of testing and treating, one may simply treat the monomer compound to reduce alkali metal to a level of less than 600 ppb, or one may add an acid stabilizer to the monomer, or one may use a combination of these treatments. It is believed that when the alkali metal has a presence of less than 600 ppb, less than 400 ppb, less then 200 ppb, or where an acid stabilizer is present that its catalytic effect can be minimized. Where the monomer component is tested for the presence of the alkali metal, the testing mechanism is not particularly limited and can be accomplished by known methods of determining concentration of the alkali metal. The step of testing may be performed at the structural units' production facility, a certification agency, a laboratory, or warehouse, for example. The bisphenol structural units may be assigned an alkali metal grading value.

It is believed that the addition of the acid stabilizer also aids in hindering the catalytic effect of the alkali metal and hence in delaying the transesterification reaction to form a polymer, such as a polycarbonate oligomers and polymers. The acid stabilizer may be added to the structural units by itself or when the structural units are combined with other reactants. Where the acid stabilizer is added, the addition mechanism may be accomplished by known methods of adding additives.

Suitable acid stabilizers include acids, acid salts, esters of acids or their combinations. The addition of the acid or its salt or ester often deactivates catalytically active species such as alkali metals. Particularly useful classes of acids, acid salts and esters of acids are those derived from a phosphorous containing acid such as phosphoric acid, phosphorous acid, hypophosphorous acid, hypophosphoric acid, phosphinic acid, phosphonic acid, metaphosphoric acid, hexametaphosphoric acid, thiophosphoric acid, fluorophosphoric acid, difluorophosphoric acid, fluorophosphorous acid, difluorophosphorous acid, fluorohypophosphorous acid, fluorohypophosphoric acid, or their combinations.

The present invention can be utilized as illustrated by the following non-limiting example.

Example 1

Homopolymer Synthesis and Characterization

The following were added into a 2 liter glass reactor equipped with an overhead condenser, a phosgene inlet and a pH probe allowing monitoring pH during the course of the reaction: (a) isosorbide-bisphenol (10.73 g, 19.73 mol); (b) p-cumylphenol (0.31 g, 0.0014 mol); (b) triethylamine (0.10 mL, 0.0007 mol); (c) methylene chloride (500 mL); and (d) de-ionized water (300 mL). The reaction was allowed to stir for 10 minutes and the pH was maintained at pH=8 by the addition of 30 wt-% NaOH solution. The mixture was charged with phosgene (10.14 g, 2 g/min, 0.10 mol). During the addition of phosgene, base (30 wt-% NaOH in deionized water) was simultaneously charged to the reactor to maintain the pH of the reaction between 9-10. After the complete addition of phosgene, the reaction was purged with nitrogen gas, and the organic layer was extracted. The organic extract was washed once with dilute hydrochloric acid (HCl), and subsequently washed with de-ionized water three times. The organic layer was precipitated from methylene chloride into hot water. The polymer was dried in an oven at 110° C. before analysis.

Figure 1:
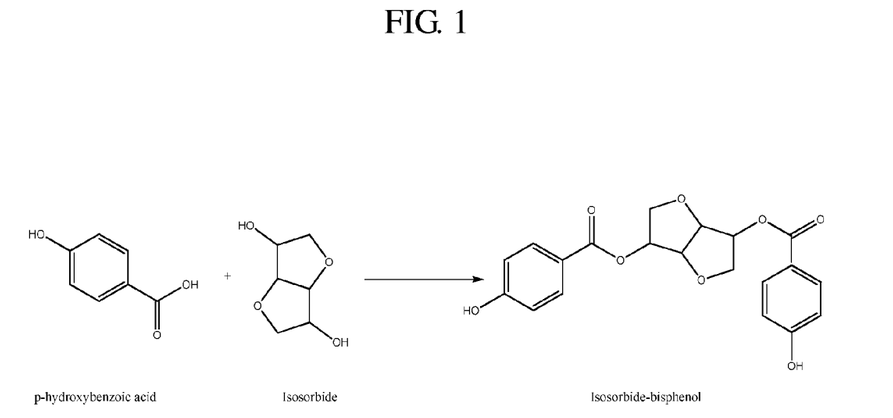
FIG. 1 shows an isosorbide-bisphenol synthetic scheme.
Figure 2:
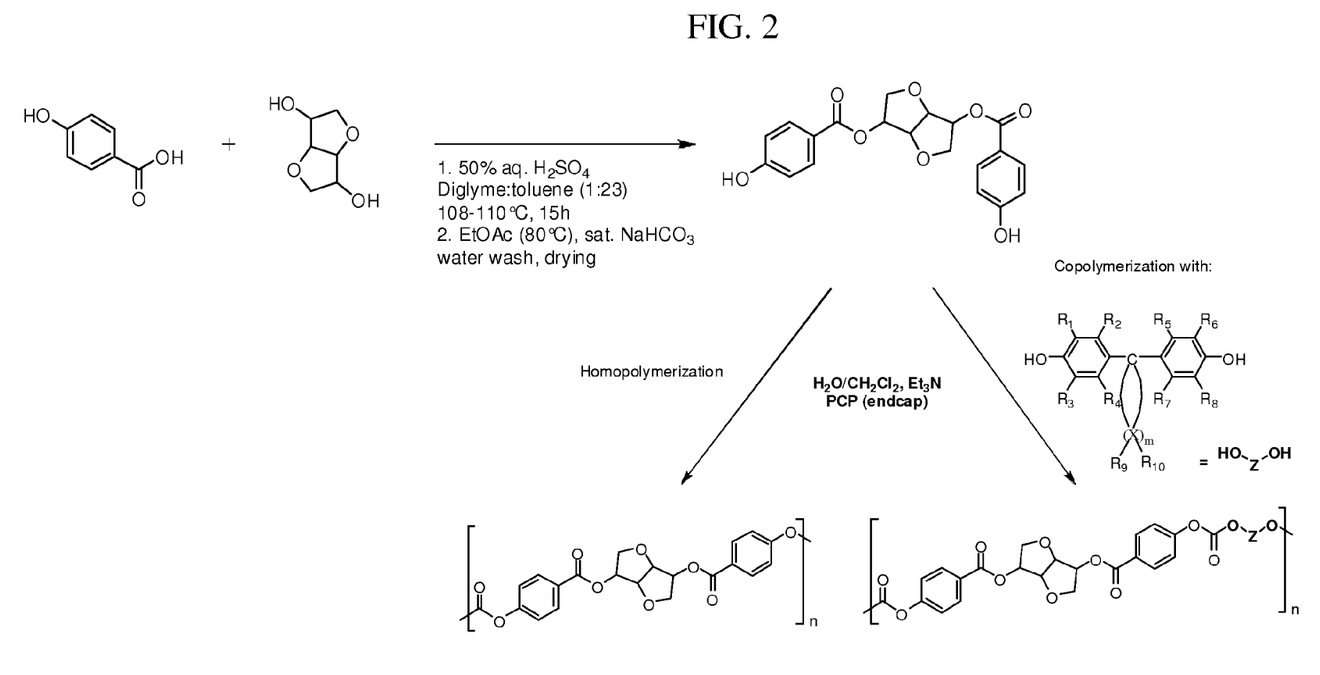
FIG. 2 is a schematic that shows the synthetic synthesis of an isosorbide polyester-carbonate.
Figure 3:
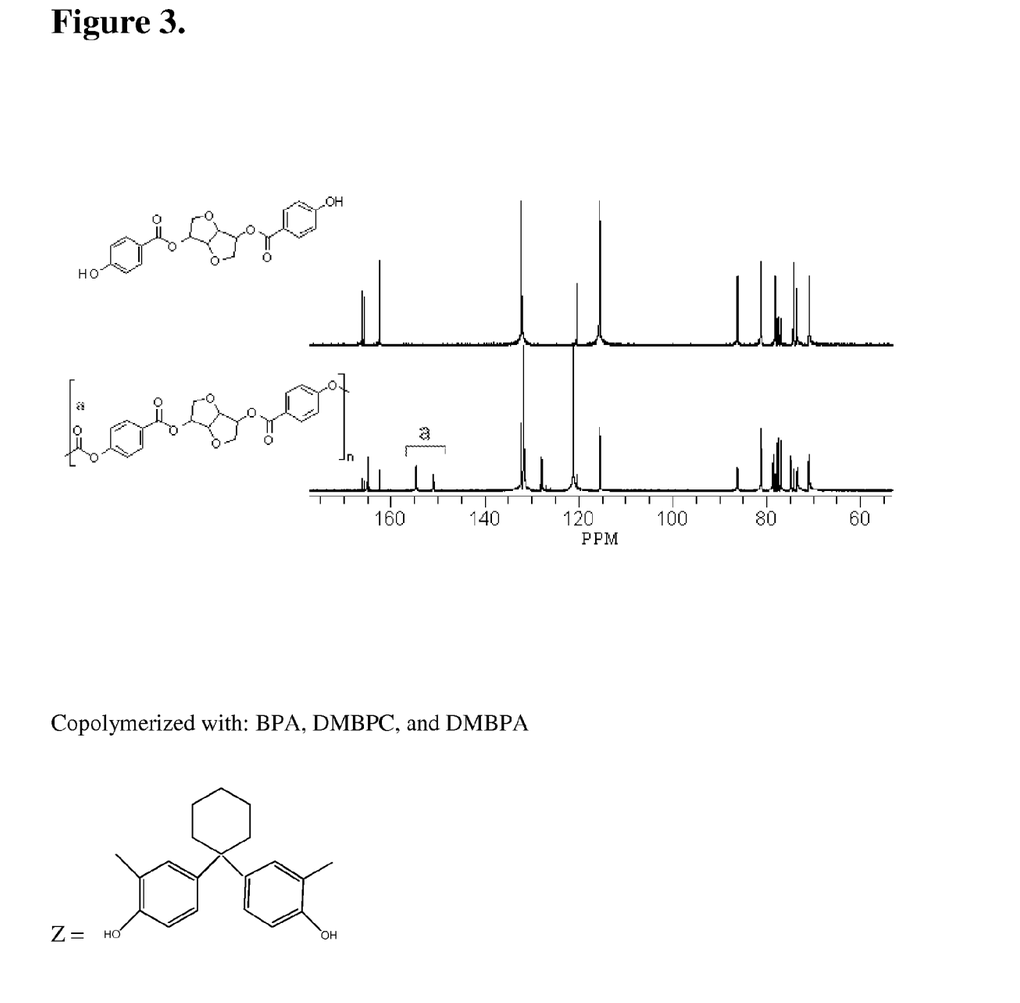
FIG. 3 shows $^{13}$C NMR spectra of isosorbide monomer and its homopolycarbonate in $CDCl_3$. The molecular weight range obtained was between 22 k and 70 k.
Figure 4:
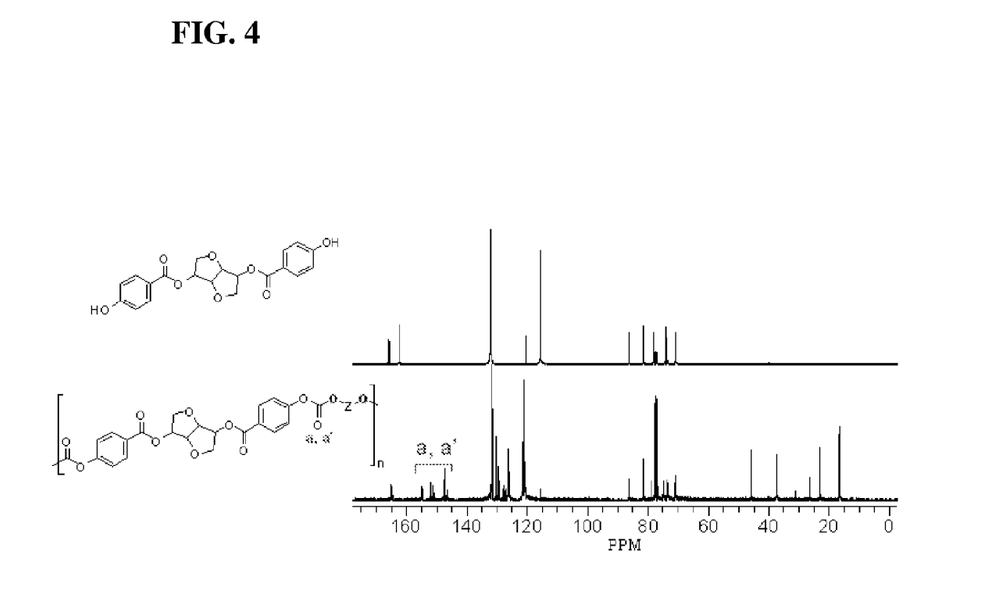
FIG. 4 shows $^{13}$C NMR spectra of isosorbide monomer and its copolymer with DMBPC (50:50) in $CDCl_3$.

Gel permeation chromatography (GPC) allowed for a determination of the molecular weight of the resulting homopolymer PC-1 (58,637 g/mol, PDI=2.30, polycarbonate standards). The resulting polymer structure was confirmed via $^{13}$C NMR spectroscopy (see FIG. 3). Differential scanning calorimetry (DSC) experiments revealed a glass temperature of 167° C. Dynamic mechanical analysis experiments revealed an elastic modulus (G') of 1969 Mpa. See Table 1.

Example 2

Copolymer Synthesis and Characterization

Copolymer of isosorbide-bisphenol monomer and 1,1-bis(4'hydroxy-3'methylphenyl)cyclohexane (DMBPC) was obtained via interfacial polymerization. The following were added into a 2 liter glass reactor equipped with an overhead condenser, a phosgene inlet and a pH probe allowing monitoring pH during the course of the reaction: (a) DMBPC (10.73 g, 0.0362 mol); (b) isosorbide-bisphenol (14 g, 0.0362 mol); (c) p-cumylphenol (0.41 g, 0.0022 mol); (d) triethylamine (0.10 mL, 0.0007 mol); (e) methylene chloride (23 L); and (f) de-ionized water (10.8 L). The reaction was allowed to stir for 10 minutes and the pH was maintained at pH=8 by the addition of 30 wt-% NaOH solution. The mixture was charged with phosgene (10.21 g, 2 g/min, 0.10 mol). During the addition of phosgene, base (30 wt-% NaOH in deionized water) was simultaneously charged to the reactor to maintain the pH of the reaction between 9-10. After the complete addition of phosgene, the reaction was purged with nitrogen gas, and the organic layer was extracted. The organic extract was washed once with dilute hydrochloric acid (HCl), and subsequently washed with de-ionized water three times. The organic layer was precipitated from methylene chloride into hot water. The polymer was dried in an oven at 110° C. before analysis.

Gel permeation chromatography (GPC) allowed for a determination of the molecular weight of the resulting homopolymer PC-2 (37,976 g/mol, PDI=1.69, polycarbonate standards). The resulting polymer structure was confirmed via $^{13}$C NMR spectroscopy (see FIG. 3). Differential scanning calorimetry experiments revealed a glass temperature of 154° C. Dynamic mechanical analysis experiments revealed a elastic modulus (G') of 1654 Mpa. See Table 1.

TABLE 1

| Examples/Components | Example 1 | Example 2 |
|---|---|---|
| DMBPC, g | — | 10.73 |
| Isosorbide bisphenol, g | 28 | 14 |
| p-cumylphenol, g | 0.31 | 0.41 |
| Triethylamine, mL | 0.1 | 0.1 |
| Phosgene, g | 10.14 | 10.21 |
| Water, mL | 300 | 300 |
| Methylene chloride, mL | 500 | 500 |
| Properties | | |
| Resulting Polymer | PC-1 | PC-2 |
| Molecular Weight, g/mol | 58,637 | 37,976 |
| Tg, ° C. | 167 | 154 |
| G', Mpa | 1,969 | 1,654 |

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims. The appended claims should be construed broadly and in a manner consistent with the spirit and the scope of the invention herein.

We claim:

1. A method of making an isosorbide-containing polymer, comprising subjecting at least one isosorbide-bisphenol of formula I:

(I)

and a formula I-reacting compound to polymerization conditions, wherein R1 is an isosorbide unit, and R2-R9 are independently selected from the group consisting of a hydrogen, a halogen, a C1-C6 alkyl, a methoxy, an ethoxy, and an alkyl ester, and wherein the formula I-reacting compound reacts with the bisphenol of formula I to form a structural unit that is polymerized into an isosorbide-containing polymer.

2. The method of claim 1, wherein the isosorbide-bisphenol has a pKa value of between 8 and 11.

3. The method of claim 1, wherein the isosorbide unit is derived from an isosorbide selected from the group consisting of 2,6-dioxabicyclo[3.3.0]octan-4,8-diol; 1,4:3,6-dianhydro-D-glucitol; 2,3,3a,5,6a-hexahydrofuro[3,2-b]furan-3,6-diol, and isomers thereof.

4. The method of claim 1, wherein the isosorbide-containing polymer is a homopolymer.

5. The method of claim 1, wherein the isosorbide-containing polymer is a copolymer.

6. The method of claim 1, wherein the formula-I reacting compound is selected from the group consisting of a phosgene, a triphosgene, diacyl halide, dihaloformate, dicyanate, diester, diepoxy, diarylcarbonate, dianhydride, dicarboxylic acid, and diacid chloride.

7. The method of claim 1, wherein the structural unit is polymerized with a dihydroxy compound of formula II:

wherein Z is selected from a group consisting of an aromatic compound and an aliphatic compound.

8. The method of claim 7, wherein the aromatic dihydroxy compound is selected from the group consisting of 4,4'(3,3,5-trimethylcyclohexylidene)diphenol; 4,4'-bis(3,5-dimethyl)diphenol, 1,1-bis(4-hydroxy-3-methylphenyl)cyclohexane, 1,1-bis(4'hydroxy-3'methylphenyl)cyclohexane (DMBPC), 4,4'-1-methyl-4-(1-methyl-ethyl)-1,3-cyclohexandiyl]bisphenol (1,3 BHPM), 4-[1-[3-(4-hydroxyphenyl)-4-methylcyclohexyl]-1-methyl-ethyl]-phenol (2,8 BHPM), 3,8-dihydroxy-5a,10b-diphenyl-coumarano-2',3',2,3-coumarane (DCBP), 2-phenyl-3,3-bis(4-hydroxyphenyl)heptane, 2,4'-dihdroxydiphenylmethane, bis(2-hydroxyphenyl) metane, bis(4-hydroxyphenyl)methane, bis(4-hydroxy-5-nitrophenyl)methane, bis(4-hydroxy-2,6-dimethyl-3-methoxyphenyl)methane, 1,1-bis(4-hydroxyphenyl)ethane, 1,1-bis(4-hydroxy-2-chlorophenyl)ethane, 2,2-bis(4-hydroxyphenyl)propane (BPA), 2,2-bis(3-phenyl-4-hydroxyphenyl)propane, 2,2-bis(4-hydroxy-3-methylphenyl)propane, 2,2-bis(4-hydroxy-3-ethylphenyl)propane, 2,2-bis(4-hydroxy-3-isopropylphenyl)propane, 2,2-bis(4-hydroxy-3,5-dimethylphenyl)propane, 2,2-bis(3,5,3',5'-tetrachloro-4,4'-dihydroxyphenyl)propane, bis(4-hydroxyphenyl) cyclohexymethane, 2,2-bis(4-hydroxyphenyl)-1-phenylpropane, 2,4-dihydroxyphenyl sulfone, 4,4'-dihydroxydiphenylsulfone (BPS), bis(4-hydroxyphenyl) methane (bisphenol F, BPF), 4,4'dihydroxy-1,1-biphenyl, 2,6-dihydroxy naphthalene, hydroquinone, resorcinol, C1-3 alkyl-substituted resorcinols, 3-(4-hydroxyphenyl)-1,1,3-trimethylindan-5-ol, 1-(4-hydroxyphenyl)-1,3,3-trimethylindan-5-ol, and 2,2,2',2'-tetrahydro-3,3,3',3'-tetramethyl-1,1'-spirobi[1H-indene]-6,6'-diol, 1,3-propylene glycol, 1,2-propylene glycol, 2,2-diethyl-1,3-propanediol, 2,2-dimethyl-1,3-propanediol, 2-ethyl-2-butyl-1,3-polypropanediol, 2-ethyl-2-isobutyl-1,3-propanediol, 1,3-terbutanediol, 1,4-butanediol, 1,5-pentanediol, 1,6-hexanediol, 2,2,4-tnmethyl-1,6-hexanediol, 1,3-cyclohexanedimethanol, 1,4-cyclohexanedimethanol, and 2,2,4,4-tetramethyl-1,3-cyclobutanediol.

9. The method of claim 1, wherein the polymerization conditions are selected from the group consisting of interfacial, melt, solid state, and solution.

10. A polymer formed from the method of claim 1.

11. The polymer of claim 10, wherein the polymer is selected from the group consisting of a polycarbonate, a polyurethane, a polyurea, a polyarylate, a polyester, a polyether, a polyetheramide, a polyformal, and a polyphenylene ether.

12. The polycarbonate of claim 11, wherein the polycarbonate is wherein n is greater than 1.

13. The polycarbonate of claim 11, wherein the polycarbonate is wherein z is an aromatic compound and n is greater than 1.

14. A method of making an isosorbide-containing polymer, comprising subjecting two or more monomers comprising an isosorbide unit to polymerization conditions, wherein each monomer has a pKa value of between 8 and 11.

15. The two or more monomers of claim 14, wherein the isosorbide unit is derived from an isosorbide selected from the group consisting of 2,6-dioxabicyclo[3.3.0]octan-4,8-diol; 1,4:3,6-dianhydro-D-glucitol; 2,3,3a,5,6a-hexahydrofuro[3,2-b]furan-3,6-diol, and isomers thereof.

16. The method of claim 14, wherein the two or more monomers form a homopolymer.

17. The method of claim 14, wherein the two or more monomers form a copolymer.

18. The method of claim 14, wherein the two or more monomers are interfacially polymerized with a dihydroxy compound of formula II:

wherein Z is selected from the group consisting of an aromatic compound and an aliphatic compound.

19. The method of claim 18, wherein the aromatic dihydroxy compound is selected from the group consisting of 4,4'(3,3,5-trimethylcyclohexylidene)diphenol; 4,4'-bis(3,5-dimethyl)diphenol, 1,1-bis(4-hydroxy-3-methylphenyl)cyclohexane, 1,1-bis(4'hydroxy-3'methylphenyl)cyclohexane (DMBPC), 4,4'-1-methyl-4-(1-methyl-ethyl)-1,3-cyclohexandiyl]bisphenol (1,3 BHPM), 4-[1-[3-(4-hydroxyphenyl)-4-methylcyclohexyl]-1-methyl-ethyl]-phenol (2,8 BHPM), 3,8-dihydroxy-5a,10b-diphenyl-coumarano-2',3',2,3-coumarane (DCBP), 2-phenyl-3,3-bis(4-hydroxyphenyl)heptane, 2,4'-dihdroxydiphenylmethane, bis(2-hydroxyphenyl) metane, bis(4-hydroxyphenyl)methane, bis(4-hydroxy-5-nitrophenyl)methane, bis(4-hydroxy-2,6-dimethyl-3-methoxyphenyl)methane, 1,1-bis(4-hydroxyphenyl)ethane, 1,1-bis(4-hydroxy-2-chlorophenyl)ethane, 2,2-bis(4-hydroxyphenyl)propane (BPA), 2,2-bis(3-phenyl-4-hydroxyphenyl)propane, 2,2-bis(4-hydroxy-3-methylphenyl)propane, 2,2-bis(4-hydroxy-3-ethylphenyl)propane, 2,2-bis(4-hydroxy-3-isopropylphenyl)propane, 2,2-bis(4-hydroxy-3,5-dimethylphenyl)propane, 2,2-bis(3,5,3',5'-tetrachloro-4,4'-dihydroxyphenyl)propane, bis(4-hydroxyphenyl) cyclohexymethane, 2,2-bis(4-hydroxyphenyl)-1-phenylpropane, 2,4-dihydroxyphenyl sulfone, 4,4'-dihydroxydiphenylsulfone (BPS), bis(4-hydroxyphenyl) methane (bisphenol F, BPF), 4,4'dihydroxy-1,1-biphenyl, 2,6-dihydroxy naphthalene, hydroquinone, resorcinol, C1-3 alkyl-substituted resorcinols, 3-(4-hydroxyphenyl)-1,1,3-trimethylindan-5-ol, 1-(4-hydroxyphenyl)-1,3,3-trimethylindan-5-ol, 2,2,2',2'-tetrahydro-3,3,3',3'-tetramethyl-1,1'-spirobi[1H-indene]-6,6'-diol, 1,3-propylene glycol, 1,2-propylene glycol, 2,2-diethyl-1,3-propanediol, 2,2-dimethyl-1,3-propanediol, 2-ethyl-2-butyl-1,3-polypropanediol, 2-ethyl-2-isobutyl-1,3-propanediol, 1,3-terbutanediol, 1,4-butanediol, 1,5-pentanediol, 1,6-hexanediol, 2,2,4-tnmethyl-1,6-hexanediol, 1,3-cyclohexanedimethanol, 1,4-cyclohexanedimethanol, and 2,2,4,4-tetramethyl-1,3-cyclobutanediol.

20. A polymer formed from the method of claim 14.

21. The polymer of claim 20, wherein the polymer is selected from the group consisting of a polycarbonate, a polyurethane, a polyurea, a polyarylate, a polyester, a polyether, a polyetheramide, a polyformal, and a polyphenylene ether.

22. The polycarbonate of claim 21, wherein the polycarbonate is wherein n is greater than 1.

23. The polycarbonate of claim 21, wherein the polycarbonate is wherein z is an aromatic compound and n is greater than 1.

* * * * *